(12) United States Patent
Kuo

(10) Patent No.: US 9,329,013 B2
(45) Date of Patent: May 3, 2016

(54) REEL RULER STRUCTURE

(71) Applicant: Top Long Industrial Co., Ltd., New Taipei (TW)

(72) Inventor: Shao-Fan Kuo, New Taipei (TW)

(73) Assignee: Top Long Industrial Co., Ltd., New Taipei (TW)

( * ) Notice: Subject to any disclaimer, the term of this patent is extended or adjusted under 35 U.S.C. 154(b) by 71 days.

(21) Appl. No.: 14/481,915

(22) Filed: Sep. 10, 2014

(65) Prior Publication Data

US 2016/0069657 A1    Mar. 10, 2016

(51) Int. Cl.
*G01B 3/10*    (2006.01)

(52) U.S. Cl.
CPC ............ *G01B 3/1041* (2013.01); *G01B 3/1056* (2013.01)

(58) Field of Classification Search
CPC ............................ G01B 3/1005; G01B 3/1015
USPC ...................................... 33/767, 768
See application file for complete search history.

(56) References Cited

U.S. PATENT DOCUMENTS

| | | | | |
|---|---|---|---|---|
| 3,214,836 A * | 11/1965 | West | ............... | G01B 3/1005 242/381.3 |
| 4,938,430 A * | 7/1990 | Chapin | ............... | G01B 3/1005 242/381.3 |
| 4,998,356 A * | 3/1991 | Chapin | ............... | G01B 3/1005 242/381.3 |
| 5,245,761 A * | 9/1993 | Waldherr | ............... | G01B 3/1005 242/381.3 |
| 6,167,635 B1 * | 1/2001 | Lin | ............... | G01B 3/1005 33/755 |
| 6,272,764 B1 * | 8/2001 | Lin | ............... | G01B 3/1005 33/767 |
| 6,276,071 B1 * | 8/2001 | Khachatoorian | .... | G01B 3/1005 242/381.3 |
| 6,431,486 B1 * | 8/2002 | Lee | ............... | G01B 3/1005 242/381.3 |
| 2007/0186433 A1 * | 8/2007 | Campbell | ............ | G01B 3/1005 33/767 |
| 2008/0263885 A1 * | 10/2008 | Lin | ............... | G01B 3/1005 33/767 |
| 2009/0064526 A1 * | 3/2009 | Farnworth | ........... | G01B 3/1056 33/767 |
| 2012/0131810 A1 * | 5/2012 | Hunsberger | ......... | G01B 3/1005 33/767 |
| 2013/0185949 A1 * | 7/2013 | Burch | .................. | G01B 3/1061 33/768 |
| 2014/0290085 A1 * | 10/2014 | Delneo | ................ | G01B 3/1005 33/701 |

* cited by examiner

*Primary Examiner* — G. Bradley Bennett
(74) *Attorney, Agent, or Firm* — Leong C. Lei

(57) ABSTRACT

The present invention is related to a reel ruler structure that includes a casing, a push element pivotally installed therein with an edge extended outside, a compressing element pivotally positioned inside the casing, a linkage pivotally connected with both the push element and the compressing element for a linked movement, and an elastic element installed in between the push element and the casing so as to enable the compressing element to secure a ruler. A pressing to the push element will release the ruler for a short period of time and a relief to the push element will reset the compressing element and the push element by the elastic element. An enhancement of both convenience and safety in operating the reel ruler is thus achieved.

10 Claims, 6 Drawing Sheets

REEL RULER STRUCTURE

(a) TECHNICAL FIELD OF THE INVENTION

The present invention is related to a reel ruler structure, particularly a reel ruler structure with enhanced convenience and safety in operation.

(b) DESCRIPTION OF THE PRIOR ART

A reel ruler of the prior art includes a case, a reel installed therein, a ruler as wrapped thereon with an end extended outside the case, and a securing element movably positioned at the case. Thereby the ruler can be directly extracted for measurement for which an operation of the securing element is required to slide it till its one edge either compressing the ruler in order to secure a position thereof or release the ruler for automatic retraction into the case by the reel.

However, an accidental retraction of the ruler is so frequent and common when an user extracts the ruler for measurement that causes not only inconvenience but also injury to the user as well as damages the reel ruler of the prior art. Further, both injury to the user and damage to the reel ruler of the prior art is likely taking place during the retraction of the ruler due to an over-speed of the automatic retraction by the reel. In addition, either securing or releasing of the ruler requires the operation of the securing element in order to slide a certain distance such that using the reel ruler of the prior art is relatively inconvenient and lacking immediate response.

SUMMARY OF THE INVENTION

An objective of the present invention is to improve convenience in operation and prevent injury thereof.

Therefore the present invention includes a casing inside which a compressing element and a push element with an edge extended outside are provided and the compressing element and the push element are pivotally connected with a linkage for a linked movement. Further an elastic element is installed in between the push element and the casing within which a ruler is positioned with an end as extended outside and a hook is installed to the end outside the casing while the ruler is wrapped around a reel device positioned inside the casing. Therefore the elastic element can apply a force to the push element and linked to the compressing element for securing the ruler by compression and the compressing element can automatically secure the ruler once it is extracted. When it needs to retract the ruler by the reel device, it only needs to press the push element extended outside the casing for a movement of few millimeters in order to shift the compressing element for releasing the ruler. Once the push element is released, the elasticity of the elastic element will reset the compressing element so as to continuously secure the ruler by compression such that the response is immediate to prevent over-speed during the retraction of the ruler for achieving the enhancement of both convenience and safety in operation

DETAILED DESCRIPTION OF THE PREFERRED EMBODIMENTS

Figure 1:
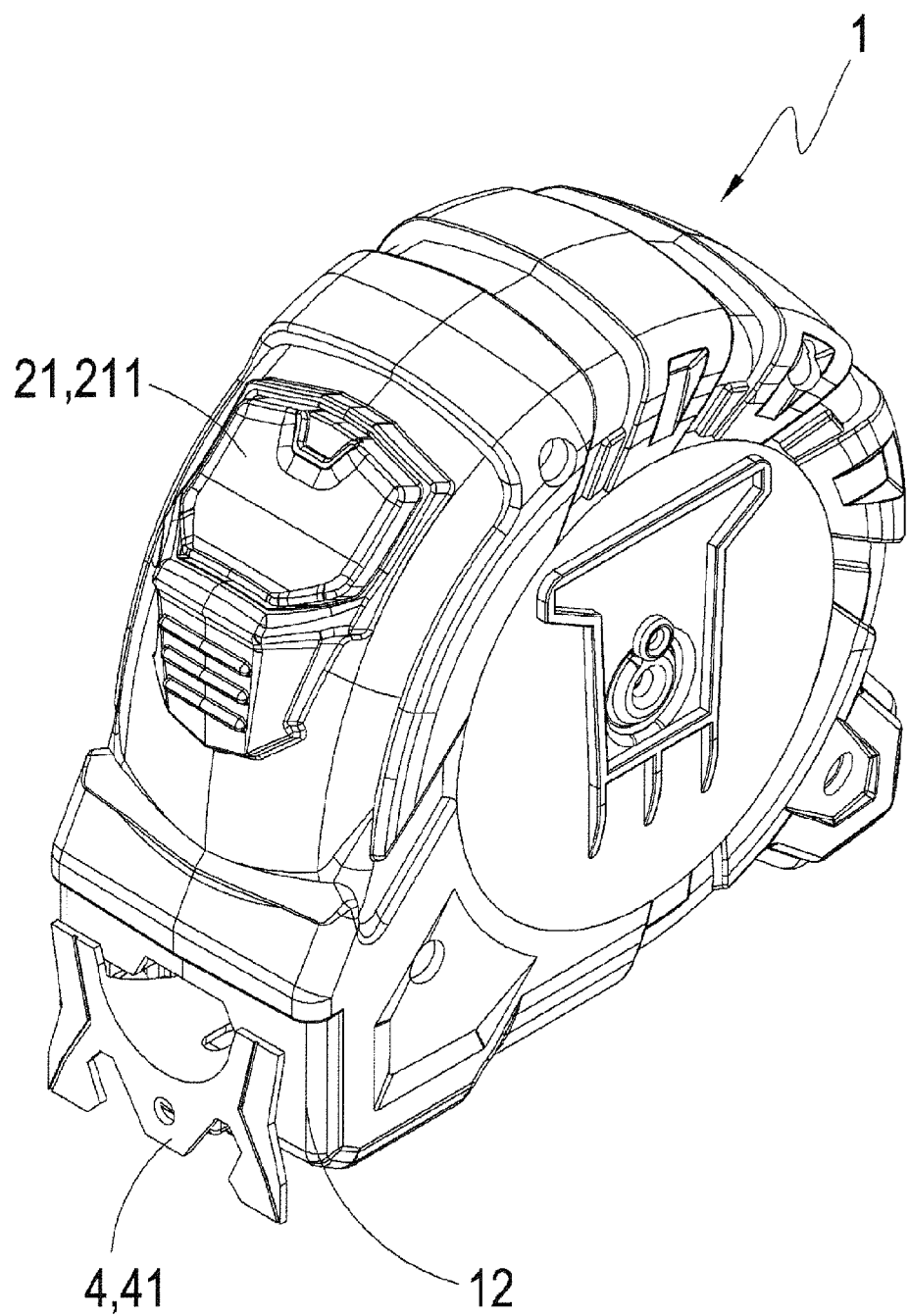
FIG. 1 is a schematic diagram illustrating an external structure of a preferred embodiment of the present invention.
Figure 2:
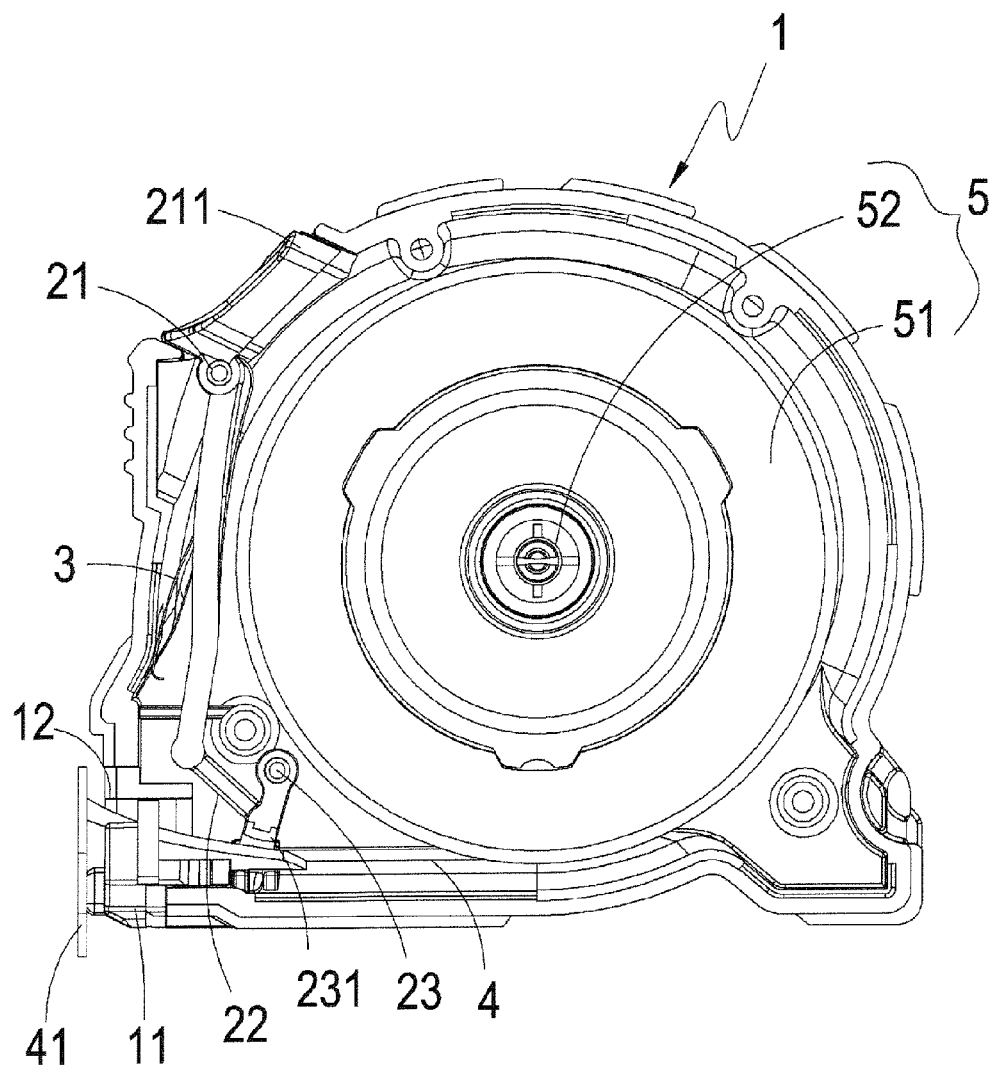
FIG. 2 is a schematic diagram illustrating an internal structure of the preferred embodiment of the present invention.
Figure 3:
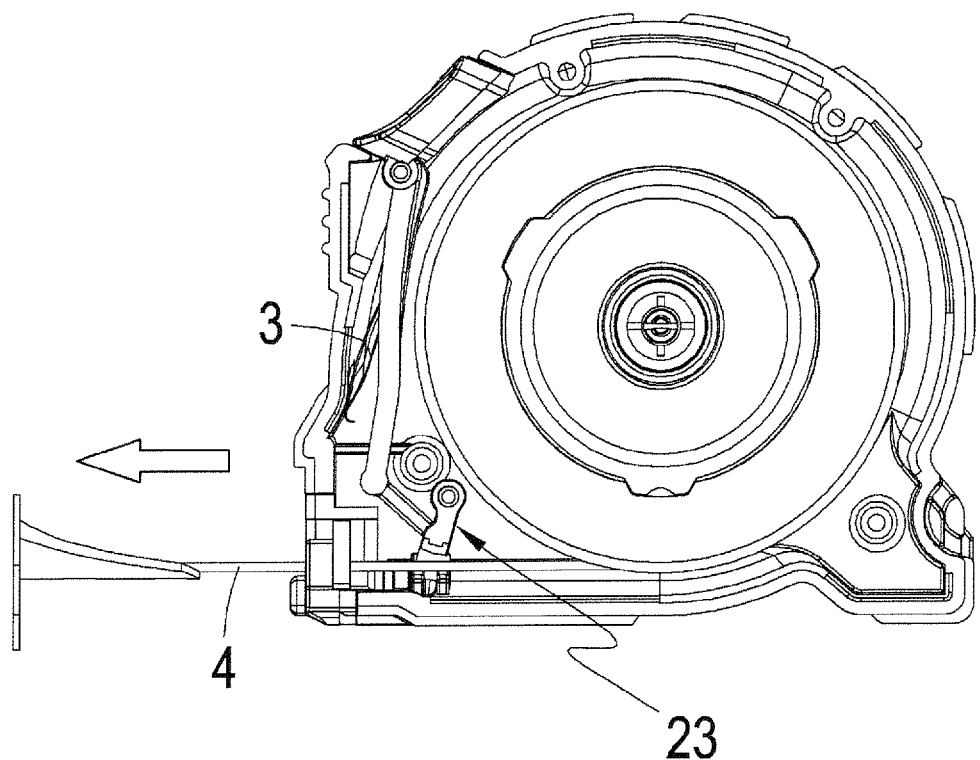
FIG. 3 is a schematic diagram illustrating a state of securing by compression of the preferred embodiment of the present invention.
Figure 4:
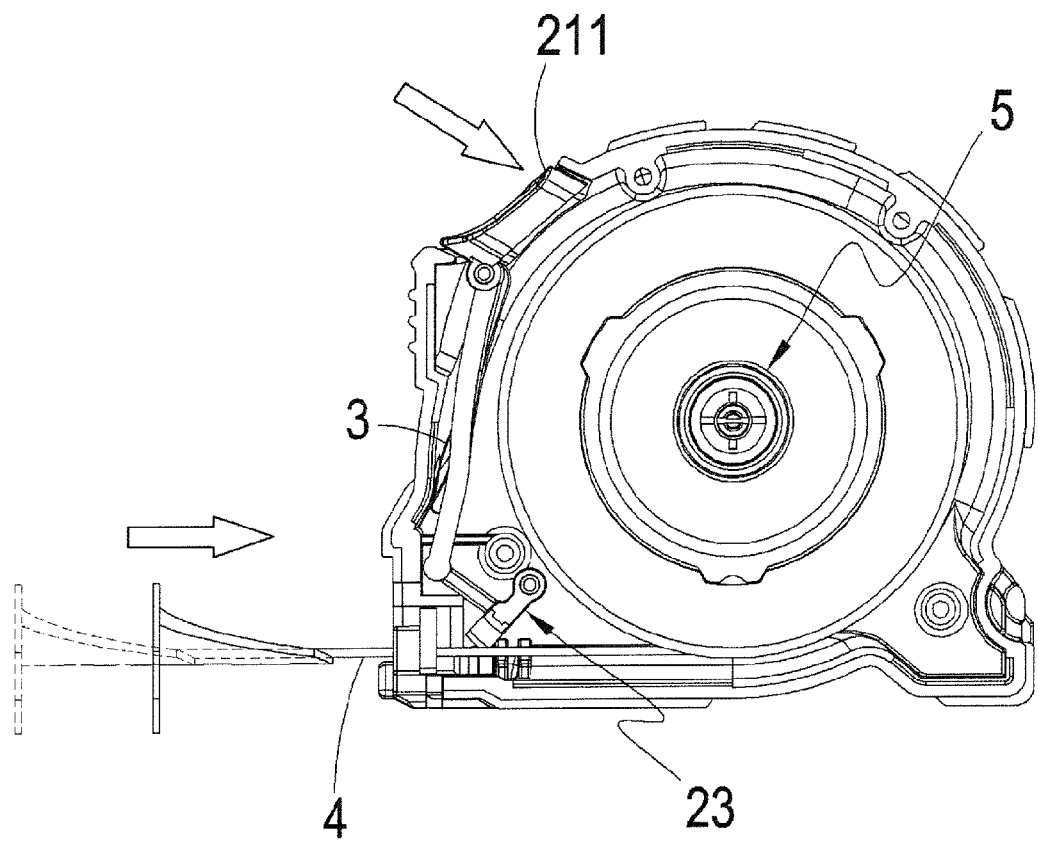
FIG. 4 is a schematic diagram illustrating a state of releasing of the preferred embodiment of the present invention.

Please refer FIGS. 1 and 2. A preferred embodiment of the present invention includes a casing 1, a push element 21, which is pivotally installed inside the casing 1, a compressing element 23, which is pivotally positioned inside the casing 1, a linkage 22, which is pivotally connected to the push element 21 and the compressing element 23 for a linked movement, an elastic element 3, a ruler 4 and a reel device 5 on which the ruler 4 is wrapped that a push protrusion 211 is configured at an edge of the push element 21 as extended outside the casing 1 and the other edge of the push element 21 is pivotally connected to an end of the linkage 22 for the linked movement while the other end of the linkage 22 is pivotally connected to the compressing element 23 for the linked movement as the compressing element 23 is to secure the ruler 4 by compression. Further, the compressing element 23 is provided with a friction part 231, which is made of soft substance, at a contact area to the ruler 4 for enhancing an effect of securing it by compression. The elastic element 3 can be either a bounce leaf or a spring, which is installed in between the push element 21 and the casing 1, in order to apply a force onto the push element 21 so as to produce the linked movement of the compressing element 23. The reel device 5 is positioned inside the casing 1 and includes an extension wheel 51 and a shaft 52, which is assembled by the extension wheel 5 in a socket manner and made of zinc alloy for enhancing a structural strength, that the reel device 5 can automatically retract the ruler 4. An end of the ruler 4 is extended outside the casing 1 and installed with a hook 41, which is to facilitate a measurement and prevent the ruler 4 from complete retraction into the casing 1. The casing 1 is provided with an opening 12 through which the ruler 4 is extended outside while a damping element 11 at a side of the casing 1 that is corresponding to the hook 41 for reducing an impact due to the retraction of the ruler 4.

Please refer FIG. 1 through FIG. 4. Usually the elastic element 3 applies the force to the compressing element 23 in order to secure the ruler 4 by compression. A pulling of the ruler 4 will simultaneously shift the compressing element 23 so as to release the ruler 4 and the elastic element 3 will again apply the force to secure the ruler 4 once the pulling of the ruler 4 is terminated. When it needs to retract the ruler 4 by the reel device 5, it only needs a pressing to the push protrusion 211 of the push element 21 for a movement of few millimeters in order to deform the elastic element 3 for shifting the compressing element 23 to release the ruler 4. A relief of the push protrusion 211 will reset the push element 21 by an elasticity of the elastic element 3 so as to shift the compressing element 23 for continuously securing the ruler 4 by compression.

Therefore it only needs to press the push element 21 for the movement of few millimeters when retracting the ruler 4 that the operation is not only relatively easy but also considerably safe because the ruler 4 is automatically secured by the compressing element 23 and an accidental retraction of ruler 4 is thus prevented. Further, the few millimeters movement of the push element 21 is adequate for control so that an immediate response to secure the ruler 4 can be achieved in order to prevent injury to users and damage to the reel ruler.

Figure 5:
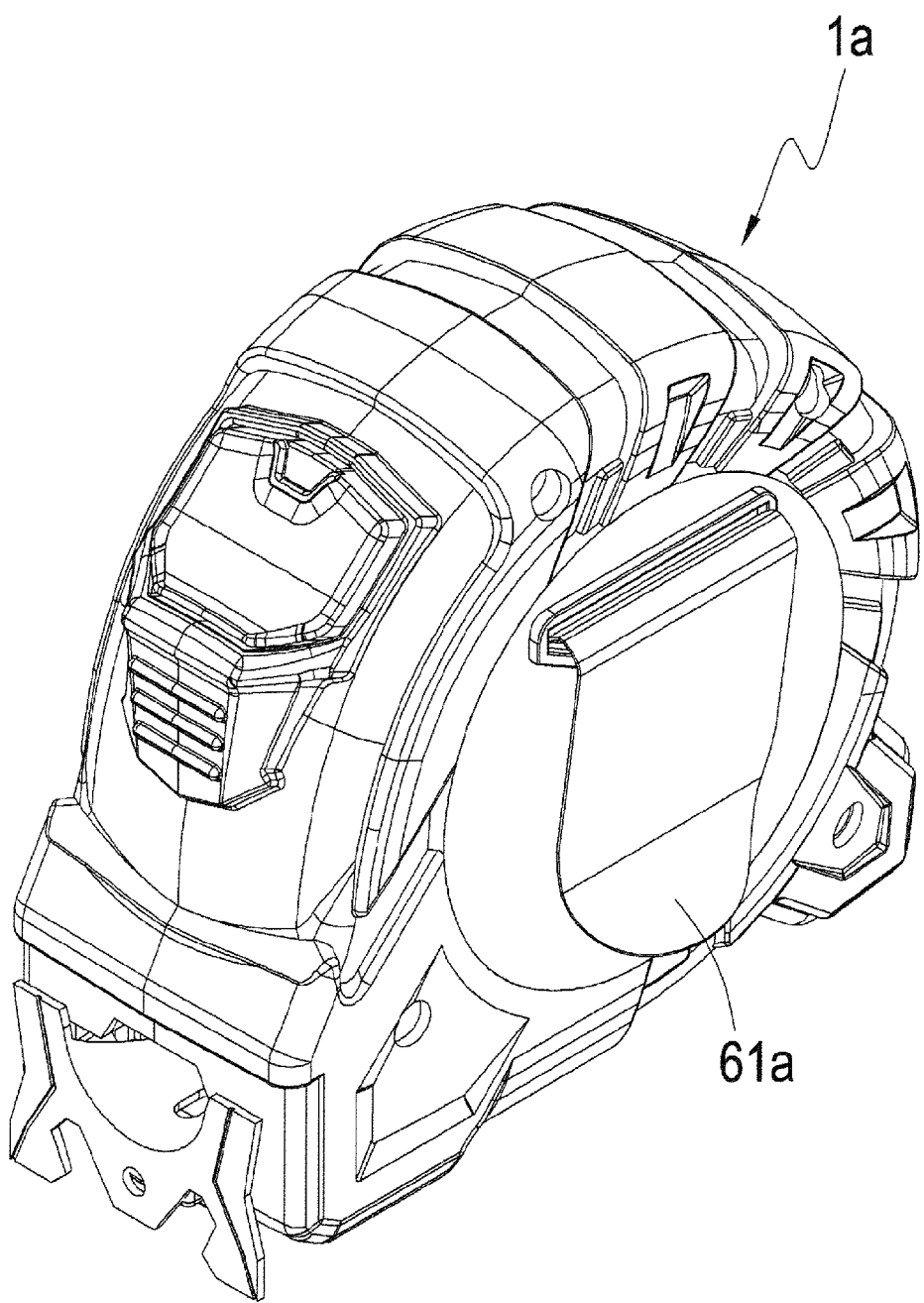
FIG. 5 is a schematic diagram of the other preferred embodiment of the present invention.

Please refer FIG. 5 illustrating the other preferred embodiment in similarity to the above-mentioned with a deviation that at least a buckle 61*a* is provided at the casing 1*a* or convenient carrying.

Figure 6:
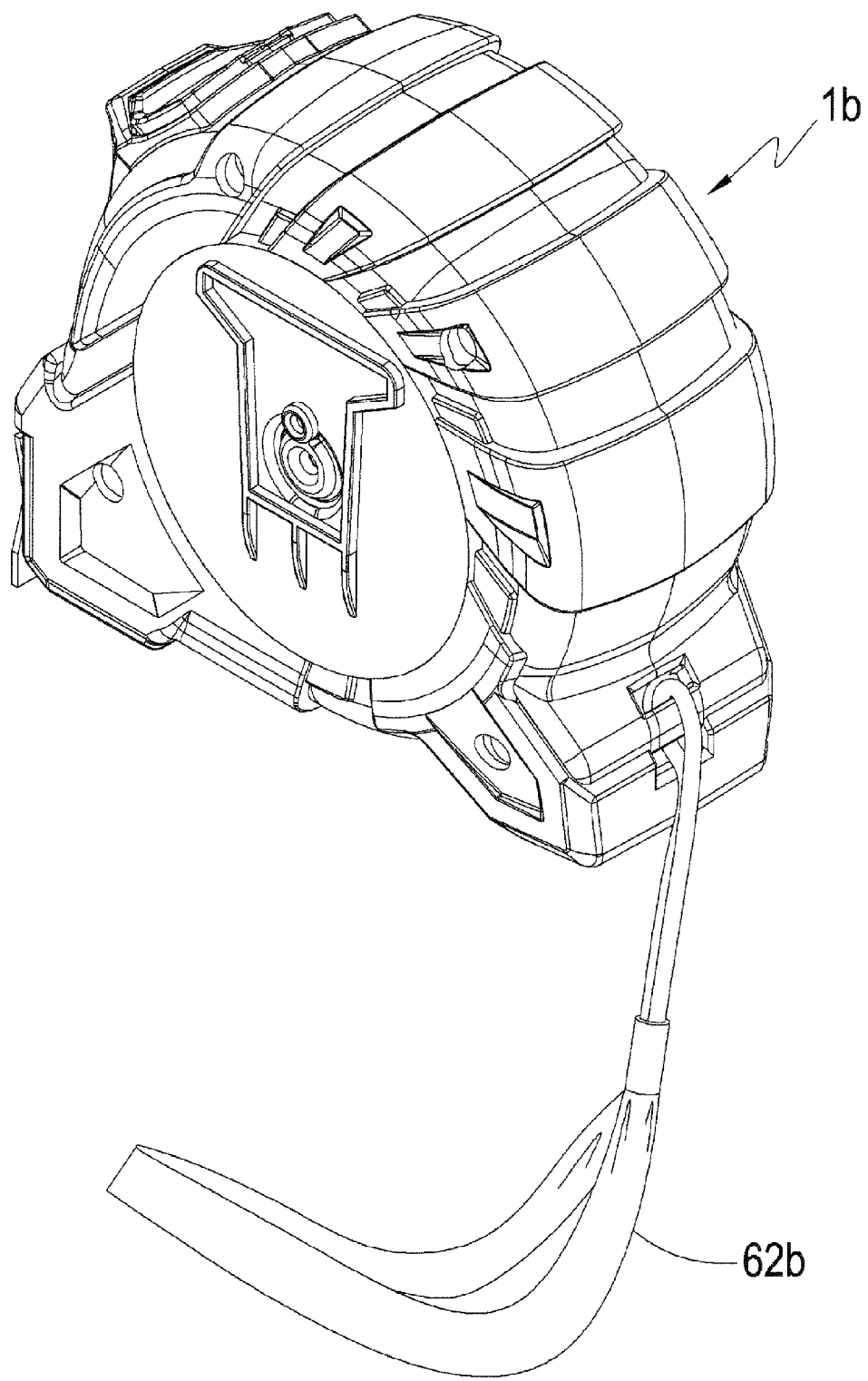
FIG. 6 is a schematic diagram of another preferred embodiment of the present invention.

Please refer FIG. 6 illustrating another preferred embodiment in similarity to the first preferred embodiment with a deviation that at least a strip 62*b* is provided at the casing 1*b* for convenient carrying.

Therefore the critical technique of the present invention in terms of improvement over the prior art is the cooperation of the push element 21, the linkage 22, the compressing element 23 and the elastic element 3 for achieving the enhancement of both convenience and safety in operation.

I claim:

1. A reel ruler structure comprising
    a casing;
    a ruler, positioned inside said casing, having an end extended outside said casing and a hook installed at the end;
    a reel device, positioned inside said casing for automatically retracting said ruler as wrapped around said reel device;
    a push element, pivotally installed inside said casing with an edge extended outside said casing;
    a linkage with an end pivotally connected to the other edge of said push element for a linked movement;
    a compressing element for securing said ruler by compression, pivotally positioned inside said casing and pivotally connected with the other end of said linkage for a linked movement; and
    an elastic element, installed in between said push element and said casing for applying a force onto said push element so as to continuously secure said ruler by compression
    thereby a pressing on said push element deforms said elastic element and shifts said compressing element for releasing said ruler while a relief to said push element resets said push element by an elasticity of said elastic element so as to shift said compressing element for continuously securing said ruler by compression.

2. The reel ruler structure of claim 1 wherein said push element is configured with a push protrusion at the edge that is extended outside said casing.

3. The reel ruler structure of claim 1 wherein the hook is to facilitate a measurement and prevent said ruler from complete retraction into said casing.

4. The reel ruler structure of claim 3 wherein a damping element is provided at a side of said casing that is corresponding to the hook for reducing an impact due to the retraction of said ruler.

5. The reel ruler structure of claim 1 wherein said casing is provided with an opening through which said ruler is extended outside.

6. The reel ruler structure of claim 1 wherein said reel device includes an extension wheel and a shaft that is assembled by the extension wheel in a socket manner and made of zinc alloy for enhancing a structural strength.

7. The reel ruler structure of claim 1 wherein said compressing element is provided with a friction part that is at a contact area to said ruler and made of soft substance for enhancing an effect of securing by compression.

8. The reel ruler structure of claim 1 wherein said casing is provided with at least a buckle on at least one side thereof for convenient carrying.

9. The reel ruler structure of claim 1 wherein said casing is provided with at least a strip on at least one side thereof for convenient carrying.

10. The reel ruler structure of claim 1 wherein said elastic element is a bounce leaf or a spring.

\* \* \* \* \*